(12) United States Patent
Hozumi et al.

(10) Patent No.: US 8,516,687 B2
(45) Date of Patent: Aug. 27, 2013

(54) VEHICLE BATTERY REPLACING APPARATUS

(75) Inventors: Mamoru Hozumi, Kariya (JP); Yoshio Ojima, Kariya (JP); Takahiro Fukagawa, Kariya (JP); Takashi Murase, Kariya (JP)

(73) Assignee: Kabushiki Kaisha Toyota Jidoshokki, Aichi (JP)

( * ) Notice: Subject to any disclaimer, the term of this patent is extended or adjusted under 35 U.S.C. 154(b) by 0 days.

(21) Appl. No.: 13/417,909

(22) Filed: Mar. 12, 2012

(65) Prior Publication Data

US 2012/0233850 A1      Sep. 20, 2012

(30) Foreign Application Priority Data

Mar. 15, 2011    (JP) .................. 2011-056843

(51) Int. Cl.
B60S 5/06      (2006.01)
(52) U.S. Cl.
USPC ................. 29/729; 29/762; 187/218
(58) Field of Classification Search
CPC ........................................................ B60S 5/06
USPC ............................ 187/218, 219; 29/729, 762
See application file for complete search history.

(56) References Cited

U.S. PATENT DOCUMENTS

| | | | | |
|---|---|---|---|---|
| 2,458,986 A | * | 1/1949 | Frey | 187/219 |
| 4,087,895 A | * | 5/1978 | Etienne | 29/252 |
| 4,102,273 A | * | 7/1978 | Merkle et al. | 104/34 |
| 5,031,726 A | * | 7/1991 | Wakamiya | 187/204 |
| 5,612,606 A | * | 3/1997 | Guimarin et al. | 320/109 |

FOREIGN PATENT DOCUMENTS

| | | |
|---|---|---|
| FR | 2685547 A1 | 6/1993 |
| JP | 6-262951 A | 9/1994 |
| JP | 2003-118397 A | 4/2003 |
| JP | 2010-173364 A | 8/2010 |
| JP | 2010-173365 A | 8/2010 |
| JP | 2011-31813 A | 2/2011 |
| WO | 2010/070642 A1 | 6/2010 |
| WO | 2012/032242 A1 | 3/2012 |

OTHER PUBLICATIONS

Extended European Search Report dated May 2, 2013 issued in corresponding European Patent Application No. 12158749.7.

* cited by examiner

Primary Examiner — Livius R Cazan
(74) Attorney, Agent, or Firm — Sughrue Mion, PLLC

(57) ABSTRACT

A battery replacing apparatus includes a battery mount portion, vehicle hoist members, and a lifting-lowering means for lifting and lowering the battery mount portion. When attaching a battery unit to or detaching a battery unit from the battery support portion of an electric vehicle, the vehicle hoist members are moved together with the battery mount portion to be brought into contact with the vehicle body. The vehicle hoist members are formed like rods extending in the front-rear direction of the vehicle. The vehicle hoist members are arranged on the left and right sides of the battery unit placed on the battery mount portion. The battery unit is attached to the battery support portion of the vehicle or detached from the battery support portion from below.

4 Claims, 6 Drawing Sheets

VEHICLE BATTERY REPLACING APPARATUS

BACKGROUND OF THE INVENTION

The present invention relates to a vehicle battery replacing apparatus, and more specifically, to a battery replacing apparatus that attaches or detaches a battery into or from a battery support portion of a vehicle from below.

In an electric vehicle, when the amount of charge of the battery is less than or equal to a predetermined amount, the battery needs to charged while remaining in the vehicle, or the spent battery needs to be replaced by a fully charged battery. Japanese Laid-Open Patent Publication No. 6-262951 discloses a battery replacing apparatus for an electric vehicle. In this apparatus, a lifting-lowering means is used for installing a battery unit containing a plurality of batteries into a vehicle from below or removing a battery unit from the vehicle. In this case, the battery unit has a thin and large planar form extending along the floor panel of the vehicle. Since battery units are heavy, the apparatus of the publication is superior in terms of the weight balance of the vehicle to a method for replacing batteries by laterally moving batteries from behind or the side of the vehicle.

However, according to the technique disclosed in Japanese Laid-Open Patent Publication No. 6-262951, a part of the lower surface of a vehicle or a battery unit can receive a great load if a battery unit is attached or detached when the vehicle is inclined due to the influence of occupants or cargo. To solve the problem, battery replacing apparatuses have been proposed that are capable of replacing batteries regardless of an inclination of a vehicle, as disclosed in Japanese Laid-Open Patent Publication No. 2010-173364. The battery replacing apparatus disclosed in Japanese Laid-Open Patent Publication No. 2010-173364 includes a battery fixing means for mounting and fixing a battery. When the apparatus is used, the inclination state of the battery fixing means is adjusted first, and then a battery is attached to the vehicle from below. Specifically, the inclination in the pitching direction of a vehicle on a platform is detected by a position detecting sensor. Next, in accordance with the inclination in the pitching direction of the vehicle, the amount of rotation about a first rotational axis of a rotating actuator is corrected to adjust the inclination state of the battery fixing means. Then, the inclination in the rolling direction of the vehicle is detected by the position detecting sensor. Subsequently, in accordance with the inclination in the rolling direction of the vehicle, the amount of rotation about a second rotational axis of the rotating actuator is corrected to adjust the inclination state of the battery fixing means.

The battery replacing apparatus disclosed in Japanese Laid-Open Patent Publication No. 2010-173364 includes a polyhedron jig, on which a plurality of battery fixing means for fixing multiple types of batteries are arranged. The battery replacing apparatus further includes a rotating actuator that rotates the polyhedron jig to put the jig in a predetermined position and a predetermined inclined state. The rotating actuator rotates the polyhedron jig using the first rotational axis, which extends in the width direction of the vehicle, and the second rotational axis, which extends in the longitudinal direction of the vehicle and is used for changing the orientation of the first rotational axis. Also, a pillar that accommodates the rotation actuator is arranged on the floor surface in the vicinity of the driver's seat. The battery replacing apparatus further includes a lifting-lowering actuator that supports the polyhedron jig via the rotating actuator in a cantilever-like manner. Accordingly, the battery replacing apparatus is relatively large. Therefore, a relatively high and large under floor space needs to be formed below the vehicle mounting platform.

SUMMARY OF THE INVENTION

Accordingly, it is an objective of the present invention to provide a vehicle battery replacing apparatus that, without increasing its size, is capable of easily replacing batteries even if the vehicle is inclined at a battery replacement position.

To achieve the foregoing objective and in accordance with one aspect of the present invention, a vehicle battery replacing apparatus for detaching a battery from or attaching a battery to a battery support portion provided in a vehicle from below is provided. The apparatus includes a battery mount portion, a vehicle hoist member, and a lifting-lowering mechanism. The vehicle hoist member is moved together with the battery mount portion to contact the vehicle body at least when the battery is detached from or attached to the battery support portion. The lifting-lowering mechanism lifts and lowers the battery mount portion.

DETAILED DESCRIPTION OF THE PREFERRED EMBODIMENTS

A battery replacing apparatus for an electric vehicle according to one embodiment of the present invention will now be described with reference to FIGS. 1A to 6D.

Figure 1A:
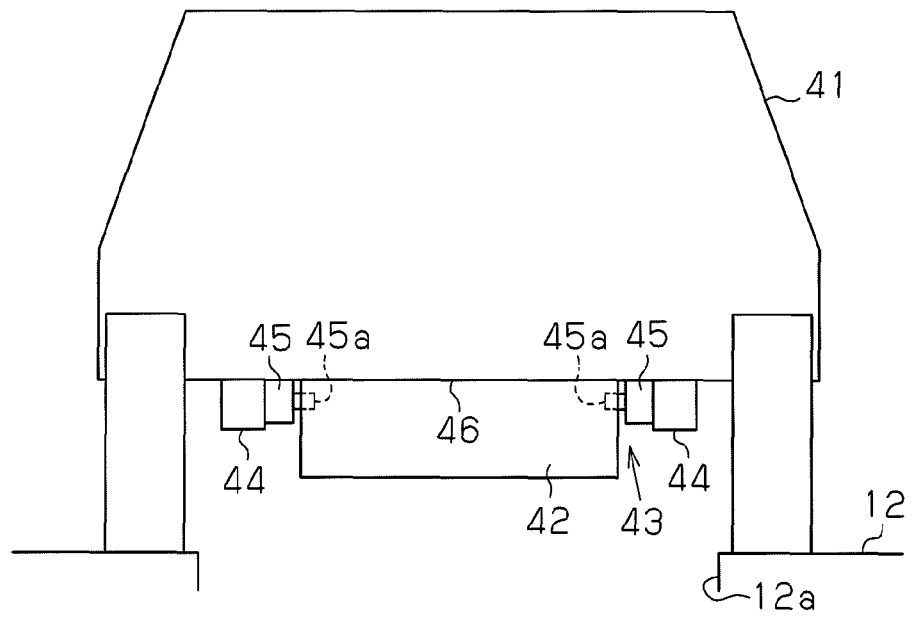
FIG. 1A is a schematic front view of a battery replacing apparatus.
Figure 2A:
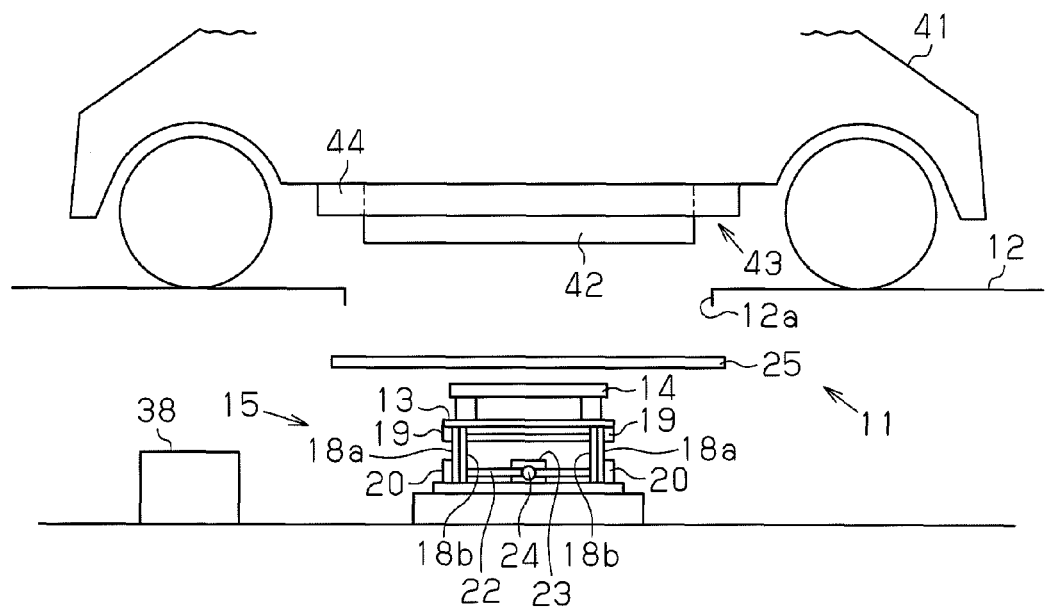
FIG. 2A is a schematic side view of the battery replacing apparatus.

As shown in FIGS. 1A and 2A, a battery replacing apparatus 11 is located on a floor surface. A support plate 12 having a horizontal upper surface is located above the battery replacing apparatus 11. A vehicle, which is an electric vehicle 41, is stopped in a level state on the support plate 12 for battery replacement. Therefore, chocks (not shown) are provided on the support plate 12. The chocks contact the front wheels of the electric vehicle 41 to determine a battery replacement position of the electric vehicle 41. The electric vehicle 41 advances from a slope (not shown) and stops at the battery replacement position on the support plate 12.

The electric vehicle 41 has a battery support portion (battery accommodating portion) 43, which supports a battery unit 42 from below in the vehicle body. The battery unit 42 has a case with an upper opening. A plurality of batteries are accommodated in the case. A pair of left and right under floor reinforcements 44 are attached to the bottom of the vehicle. Each under floor reinforcement 44 extends in the front-rear direction of the vehicle. The battery support portion 43 is located between the under floor reinforcements 44. The battery support portion 43 has locking devices 45 for preventing the battery unit 42 from falling. The battery unit 42 is attached to or detached from the vehicle body by manipulating the locking devices 45. Each locking device 45 has a piston rod 45a and a cylinder. When the piston rods 45a are engaged with engaging holes of the case of the battery unit, the battery unit 42 is locked, for example, at four positions. When the battery unit 42 is locked, its upper end contacts a floor 46 of the electric vehicle 41.

The support plate 12 has an opening 12a. The size of the opening 12a is determined to allow the battery unit 42 to be moved between the battery support portion 43 of the electric vehicle 41 at the battery replacement position and the battery replacing apparatus 11.

Figure 3A:
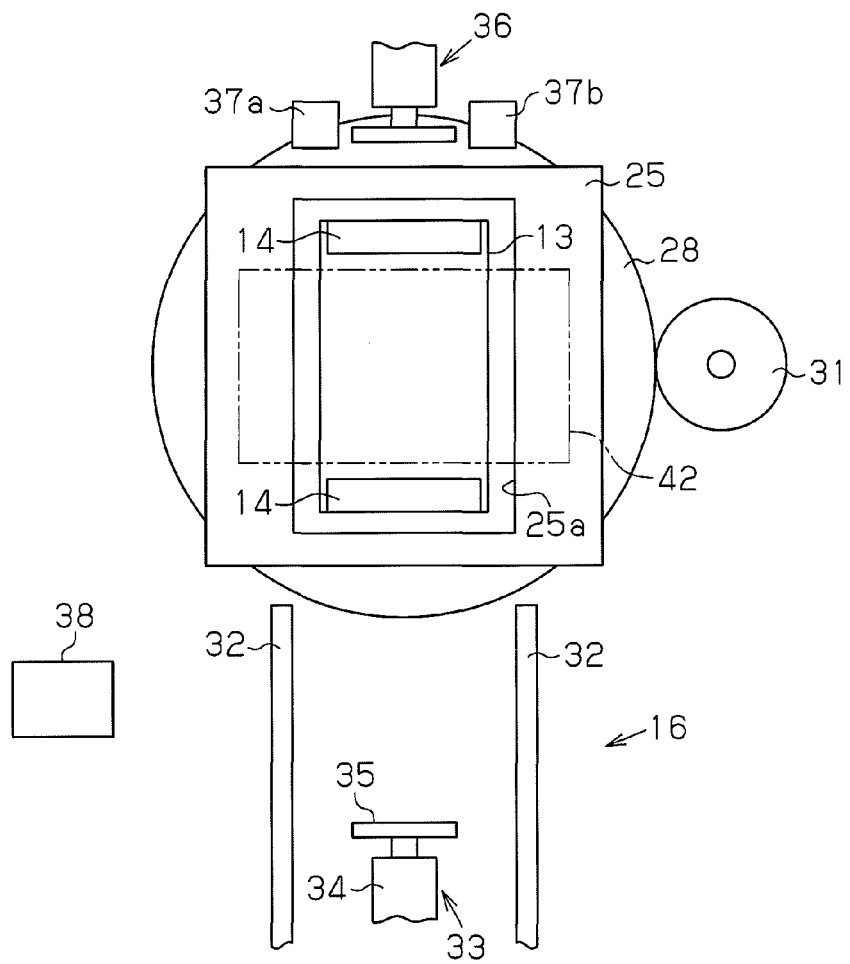
FIG. 3A is a schematic plan view showing the relationship among a battery platform, a battery mount portion, and vehicle hoist members.

The battery replacing apparatus 11 includes a battery mount portion 13, vehicle hoist members 14, and a lifting-lowering means 15. The battery mount portion 13 is arranged at a position that faces the battery support portion 43 of the electric vehicle 41 stopped at the battery replacement position. The battery mount portion 13 can be raised and lowered with the battery unit 42 placed thereon. The vehicle hoist members 14 are moved together with the battery mount portion 13. The lifting-lowering means 15 raises and lowers the battery mount portion 13. The battery mount portion 13 is formed as a rectangular plate. Also, as shown in FIG. 3A, a transporting means 16 is provided adjacent to the battery replacing apparatus 11. The transporting means 16 is capable of sending out a battery unit 42 to and receiving a battery unit 42 from the battery mount portion 13. The direction in which the transporting means 16 transports a battery unit 42 is perpendicular to the front-rear direction of the electric vehicle 41 stopped at the battery replacement position.

A pair of the vehicle hoist members 14 is fixed to the upper surface of the battery mount portion 13 via columns 14a. Each vehicle hoist member 14 is formed by a rod-like member having a support surface facing the vehicle body. The vehicle hoist members 14 are located at positions on the left and right sides of the battery unit 42 to be mounted on the battery mount portion 13, and extends in the front-rear direction of the electric vehicle along the side edges of the battery unit 42. The vehicle hoist members 14 are arranged to be capable of supporting the body of the electric vehicle 41 by contacting the bottom surfaces of the under floor reinforcements 44.

The height of the upper surfaces of the vehicle hoist members 14 from the upper surface of the battery mount portion 13 is set such that, when the vehicle hoist members 14 are lifted together with the battery mount portion 13 to the highest position to lift the vehicle body so that the vehicle is level, a clearance $\Delta$ exists between the battery unit 42 on the battery mount portion 13 and the floor 46 of the electric vehicle 41. The clearance $\Delta$ is provided such that if the vehicle body is inclined when the battery mount portion 13 and the vehicle hoist members 14 are lifted, the vehicle body can be lifted without causing the battery unit 42 to contact the floor 46. Although varying according to the size of the vehicle, the size of the clearance $\Delta$ is approximately 10 mm. Therefore, when the battery mount portion 13 is at the highest position to remove the battery unit 42 from the battery support portion 43, the clearance $\Delta$ is formed between the battery unit 42 and the battery mount portion 13.

Figure 1B:
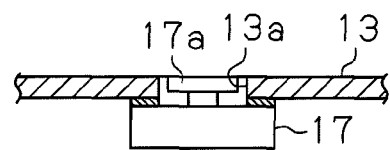
FIG. 1B is a partial cross-sectional view of a battery mount portion.
Figure 2B:
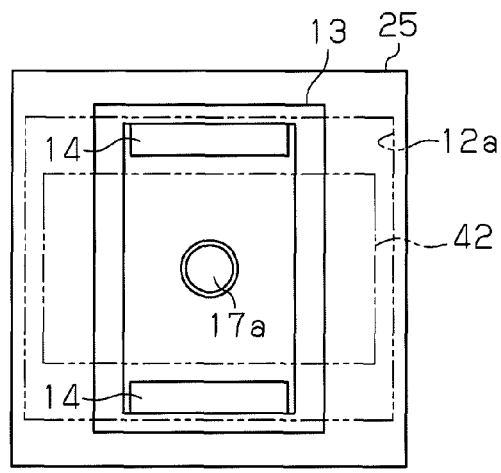
FIG. 2B is a schematic plan view of the battery replacing apparatus.

As shown in FIGS. 1B and 2B, the battery mount portion 13 has a battery lifting-lowering portion 17a. The battery lifting-lowering portion 17a moves the battery unit 42 from the lower surface of the floor 46 onto the battery mount portion 13. The battery lifting-lowering portion 17a also lifts a battery unit 42 on the battery mount portion 13 in a state in which the clearance $\Delta$ exists between the battery unit 42 and the lower surface of the floor 46. The battery lifting-lowering portion 17a is located at the center of the battery mount portion 13. A cylinder 17 is fixed to the lower surface of the battery mount portion 13. The battery lifting-lowering portion 17a is fixed to the distal end of the piston rod of the cylinder 17. A hole 13a for allowing movement of the battery lifting-lowering portion 17a is formed at the center of the battery mount portion 13. The battery lifting-lowering portion 17a is moved by the cylinder 17, between a position below the upper surface of the battery mount portion 13 and a projected position. The projected position corresponds to a position of the battery unit 42 when it is lifted from the battery mount portion 13 by the amount of the clearance $\Delta$. That is, the amount by which the battery unit 42 is moved by the battery lifting-lowering portion 17a is set to be smaller than the amount by which the battery mount portion 13 is moved by the lifting-lowering means 15.

The lifting-lowering means 15 has a pantograph mechanism with two sets of a first link 18a and a second link 18b. The links 18a, 18b have the same length and rotationally coupled to each other at the middle portions. The lower end of each first link 18a is rotationally coupled to one of a pair of lower support members 20. The upper end of each first link 18a is rotationally coupled to an upper support shaft 21, which is movable in an elongated hole 19a formed in one of a pair of upper support members 19. The lower end of each second link 18b is rotationally coupled to a lower support shaft 22, which is movable in an elongated hole 20a formed in one of a pair of lower support members 20. The upper end of each second link 18b is rotationally coupled to one of the of upper support members 19. The lower support shafts 22 are fixed to a slider (not shown), which is movable relative to a screw shaft 24 rotated by a motor 23 shown in FIG. 2A. When the motor 23 rotates in a forward direction, the distances between the ends of each first link 18a and the corresponding second link 18b are reduced, and the battery mount portion 13 is raised. When the motor 23 rotates in the reverse direction, the distances between the ends of each first link 18a and the corresponding second link 18b are widened, and the battery mount portion 13 is lowered.

The battery unit 42 is not directly transferred from the battery mount portion 13 to the transporting means 16 or from the transporting means 16 to the battery mount portion 13, but is transferred via the battery platform 25. As shown in FIGS. 1A and 2A, the battery platform 25 is located at a position higher than the battery mount portion 13 at a standby position, which is the lowest position. The battery platform 25 is configured to be rotational in a horizontal plane. Thus, even if a vehicle is stopped in a state oblique to the battery replacement position, the battery support portion 43 is capable of supporting a new battery unit 42.

Figure 3B:
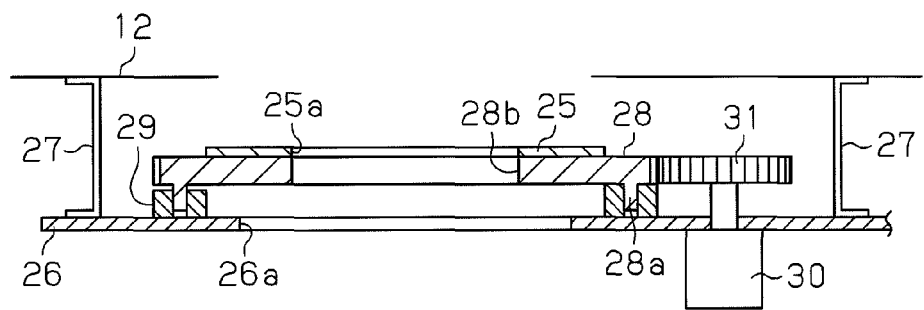
FIG. 3B is a schematic cross-sectional view of the battery platform.

More specifically, as shown in FIGS. 3A and 3B, a support member 26 is supported to be horizontal at a position below the support plate 12 via brackets 27. A gear 28 has an annular support portion 28a, which is supported by a bearing 29. The gear 28 is rotationally provided on the support member 26 via the bearing 29. The battery platform 25 is fixed to the upper surface of the gear 28. Holes 25a, 26a, 28b, through which the battery mount portion 13 can be passed, are formed in the battery platform 25, the support member 26, and the gear 28, respectively. A drive motor 30 is fixed to the support member 26. The gear 28 is meshed with a drive gear 31 driven by the drive motor 30. The gear 28 can be rotated in the forward and backward direction by the drive motor 30. In this manner, the battery platform 25 can be rotated in the horizontal plane by the drive motor 30.

The transporting means 16 is formed by a chain conveyor having a pair of chains 32. The battery unit 42 is supported and transported by a pair of chains 32 with its longitudinal direction set perpendicular to the transporting direction of the chain conveyor. The transporting means 16 transports the battery unit 42 between a transfer position near the battery platform 25 and another battery transporting means near a battery storage portion (storage position). The battery storage portion temporarily stores the recovered spent battery and stores charged batteries. The battery storing portion is formed, for example, by an automated warehouse. The chain conveyor transports a battery unit 42 along a direction that is perpendicular to the front-rear direction of the electric vehicle 41, which is stopped at the battery replacement position. The chain conveyor extends to a position near the battery platform 25. A transfer device 33 is located near the battery platform 25 of the transporting means 16. The transfer device 33 transfers a new battery unit 42 that has been transported by the transporting means 16 onto the battery platform 25.

The transfer device 33 includes a push plate 35, which is moved by a cylinder 34. A battery unit 42 is pushed by the push plate 35 and moved from the transporting means 16 onto the battery platform 25. The cylinder 34 can be moved by a lift device (not shown), between a position where the cylinder 34 can push the battery unit 42 via the push plate 35 and a retreat position where the cylinder 34 does not influence the transport of batteries. Another transfer device 36 is provided on the opposite side of the battery platform 25 to the transfer device 33. The transfer device 36 transfers a battery unit 42 mounted on the battery platform 25 onto the transporting means 16.

A displacement detecting means is provided in the vicinity of the battery platform 25 on the support member 26. The displacement detecting means detects a displacement of the battery unit 42 that has been moved from the battery support portion 43 onto the battery platform 25, with respect to a reference position of the battery unit 42. A displacement of the battery unit 42 with respect to the reference position is represented by an angle defined by a side surface of the battery unit 42 on the battery platform 25 and the front-rear direction of the electric vehicle 41. The reference position is a position at which the longitudinal direction of the battery unit 42 is parallel with the front-rear direction of the electric vehicle 41. Therefore, a displacement of the battery unit 42 with respect to the reference position indicates the degree of rotation of the longitudinal axis of the battery unit 42 from the reference position. The displacement detecting means has laser range finders 37a, 37b, which function as two sets of distance measuring means. The above described angle is detected based on the distance to the battery unit 42 measured by the laser range finders 37a, 37b. The laser range finders 37a, 37b are arranged to emit laser in the transporting direction of the transporting means 16, while avoiding the transfer device 36.

The lifting-lowering means 15, the transporting means 16, the cylinder 17, the drive motor 30, and the transfer device 33 are controlled by a controller 38 shown in FIGS. 2A and 3A. When receiving a battery replacement request signal, the controller 38 sequentially executes control for lifting the lifting-lowering means 15, control for projecting the cylinder 17, control for unlocking the locking devices 45, control for retracting the cylinder 17, and control for lowering the lifting-lowering means 15. Accordingly, a battery unit 42 that needs charging is detached from the battery support portion 43, and is moved to a position close to the transporting means 16. When a new battery unit 42 that has been charged is placed on the battery mount portion 13, the controller 38 sequentially executes control for lifting the lifting-lowering means 15, control for projecting the cylinder 17, control for locking the locking devices 45, control for retracting the cylinder 17, and control for lowering the lifting-lowering means 15. Accordingly, the new battery unit 42 is attached to the battery support portion 43. To be exact, the unlocking control and locking control of the locking devices 45 are not directly executed by the controller 38. That is, a controller (not shown) mounted on the vehicle receives a command for unlocking or locking the locking devices 45, and unlocking and locking of the locking devices 45 are executed, accordingly.

Operation of the battery replacing apparatus 11 will now be described.

Figure 4A:
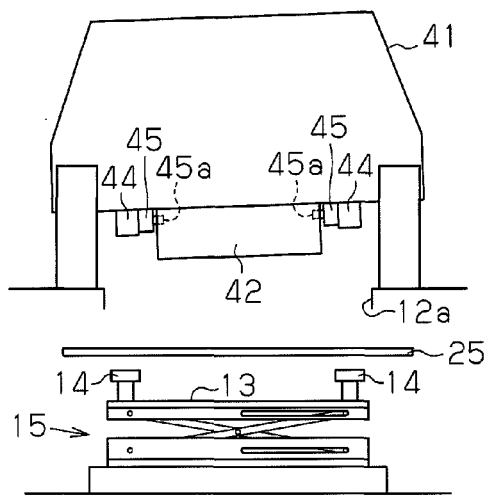
FIG. 4A is a schematic front view showing a state in which the vehicle is stopped at a battery replacement position.

The electric vehicle 41 travels onto the support plate 12 via a non-illustrated slope. Then, the electric vehicle 41 is stopped on the battery replacement position with the front wheels placed on the chocks of the support plate 12. When the electric vehicle 41 is stopped, the battery support portion 43 is arranged at a position where it faces the battery mount portion 13 of the lifting-lowering means 15 as shown in FIGS. 1A and 2A. Normally, the weight balance of a vehicle in the left-right direction and the front-rear direction varies under the influence of the air pressure and wear of the tires, the state of the suspensions, and occupants and cargos. Therefore, for example, as shown in FIG. 4A, the electric vehicle 41 is inclined relative to the horizontal direction when stopped at the battery replacement position, and the battery support portion 43 is inclined relative to the upper surface of the battery mount portion 13. In this state, the battery replacing apparatus 11 starts battery replacement.

Figure 4B:
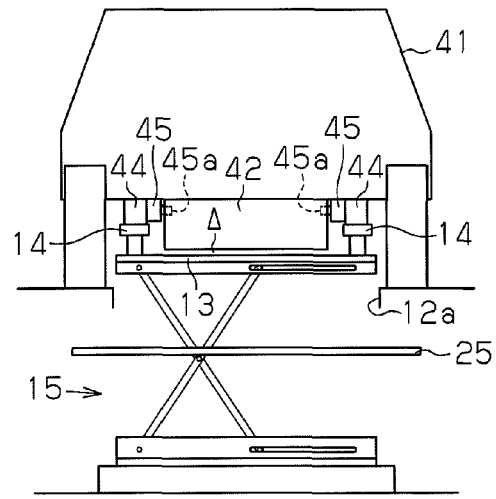
FIG. 4B is a schematic front view showing a state in which the battery mount portion has been moved to the highest position.
Figure 4C:
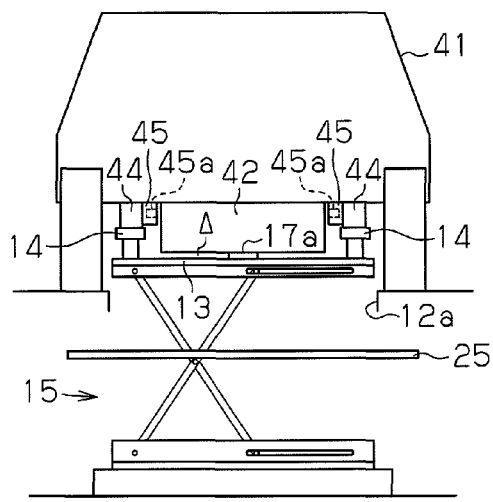
FIG. 4C is a schematic front view showing a state in which the battery lifting-lowering portion has been moved to a lifted position, and locking of the battery by locking devices has been cancelled.
Figure 4D:
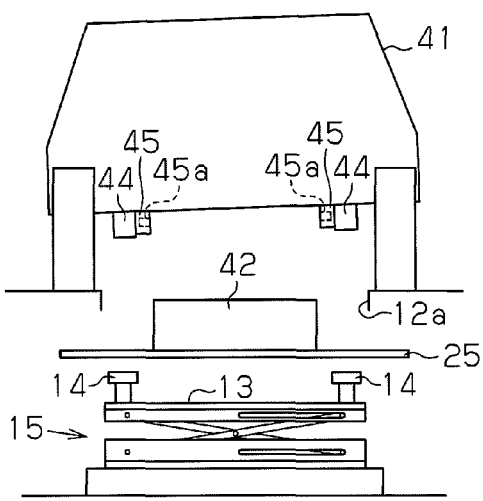
FIG. 4D is a schematic front view showing a state in which the battery mount portion has been moved to a standby position and the battery is placed on the battery platform.

First, the lifting-lowering means 15 is lifted, so that the battery mount portion 13 is lifted together with the vehicle hoist members 14. Then, the vehicle hoist members 14 contact a part of the lower surface of the under floor reinforcements 44. Thereafter, as the battery mount portion 13 and the vehicle hoist members 14 are raised, the electric vehicle 41 is raised, and the inclination of the vehicle body is gradually corrected. The operation of the lifting-lowering means 15 is stopped when the vehicle body becomes level. In this state, the inclination of the vehicle body is substantially completely corrected, as shown in FIG. 4B. Also, in this state, the clearance Δ is formed between the upper surface of the battery mount portion 13 and the lower surface of het battery unit 42 supported by the battery support portion 43. Then, the cylinder 17 is activated to raise the battery lifting-lowering portion 17a. When the locking devices 45 are actuated with the upper surface of the battery unit 42 contacting the lower surface of the floor 46 as shown in FIG. 4C, the battery unit 42 is unlocked from the battery support portion 43. Then, when the cylinder 17 is activated so that the battery lifting-lowering portion 17a is retracted, the battery unit 42 is placed on the battery mount portion 13. Subsequently, the lifting-lowering means 15 is lowered, so that the battery unit 42 is lowered while being on the battery mount portion 13. The lower surface of the battery unit 42 eventually contacts the upper surface of the battery platform 25. When the lifting-lowering means 15 is lowered further, the battery unit 42 is transferred onto the battery platform 25, and the battery mount portion 13 is lowered to the standby position together with the vehicle hoist members 14. The electric vehicle 41 is now no longer supported by the vehicle hoist members 14.

Figure 5A:
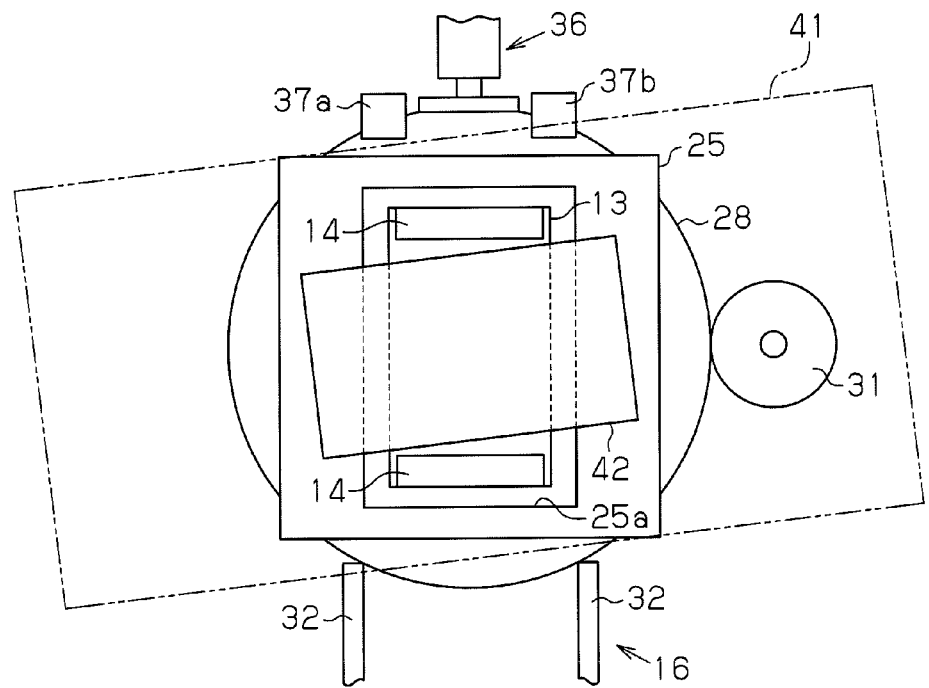
FIGS. 5A and 5B are explanatory plan views for illustrating operation of the battery platform when a vehicle is stopped in a state oblique relative to a predetermined position.
Figure 5B:
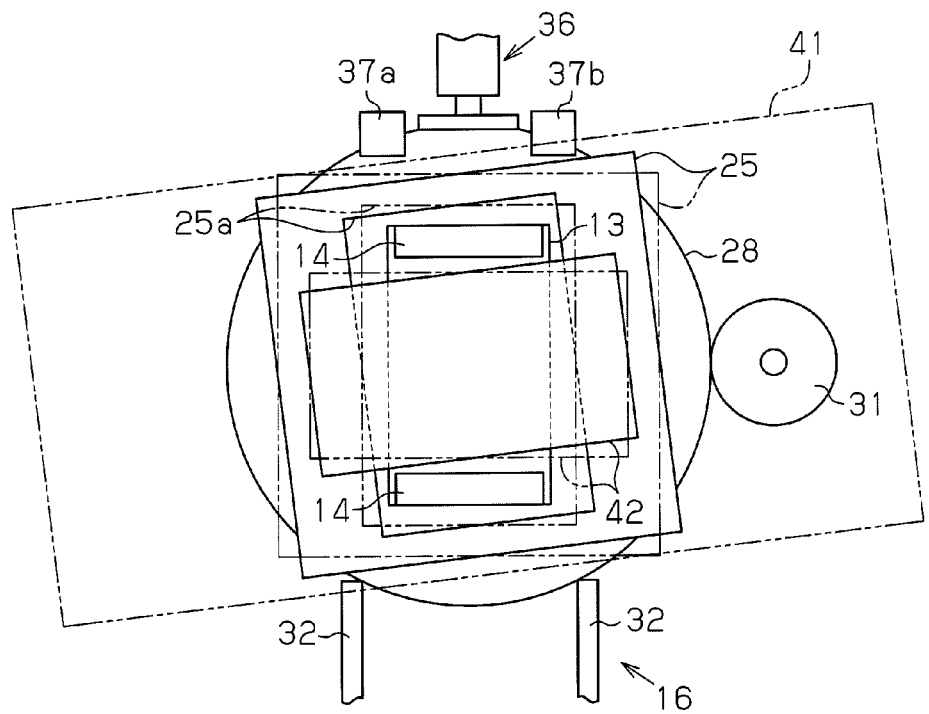

When the electric vehicle 41 is stopped at the battery replacement position, the front-rear direction of the electric vehicle 41 and the transporting direction of the transporting means 16 do not have a predetermined relationship in some cases, but are displaced obliquely from each other, depending on the conditions of the tires and the state of steering. In such a case, as shown in FIG. 5A, the battery unit 42, which has been removed from the battery support portion 43 and placed on the battery platform 25, is displaced obliquely in relation to the reference position. On the other hand, as indicated by lines formed of a pair dashes alternating with a longer dash in FIG. 5B, the battery unit 42 is arranged at the reference position after transported by the transporting means 16 and transferred onto the battery platform 25 by the transfer device 33. When the lifting-lowering means 15 is raised in this state, the battery unit 42 is raised while remaining obliquely displaced relative to the battery support portion 43. Thus, the battery unit 42 might fail to be attached to the battery support portion 43.

When the front-rear direction of the electric vehicle 41 and the transporting direction of the transporting means 16 do not have a predetermined positional relationship, the controller 38 stores in its memory the state of the battery unit 42 that has been detached from the battery support portion 43 and placed on the battery platform 25 in order to attach a new battery unit 42 to the battery support portion 43. Specifically, the laser range finders 37a, 37b detect the distance to the spent battery unit 42 on the battery platform 25. The detected data is stored in the memory of the controller 38. Next, the transfer device 36 is activated, so that the battery unit 42 is transferred from the battery platform 25 onto the transporting means 16. Thereafter, the transporting means 16 is activated to transfer the spent battery unit 42 from the battery replacing apparatus 11.

Figure 6A:
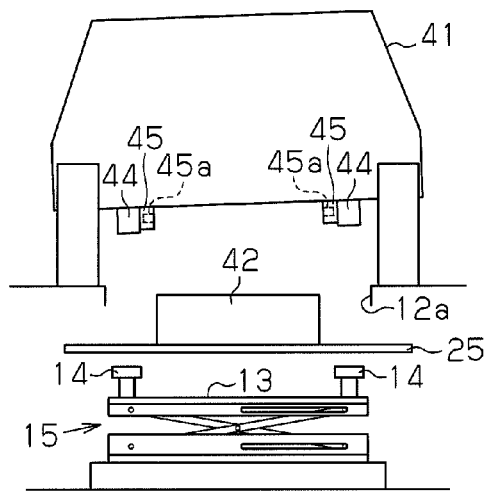
FIG. 6A is a schematic front view showing a state in which a new battery has been placed on the battery mount portion in the standby position.

Subsequently, a fully charged new battery unit 42 is transferred onto the transporting means 16 from the battery storage portion by the battery transporting means, and is taken into the battery replacing apparatus 11. The new battery unit 42 is transported by the transporting means 16 to a transfer position in the vicinity of the battery platform 25. Next, the transfer device 33 is activated, so that the new battery unit 42 is transferred from the transporting means 16 onto the battery platform 25 as shown in FIG. 6A. At this time, the battery unit 42 is placed at the reference position on the battery platform 25 as indicated by lines formed of a pair dashes alternating with a longer dash in FIG. 5B. On the other hand, the electric vehicle 41 is stopped obliquely as indicated by a line formed of a pair dashes alternating with a longer dash in FIG. 5B. In order to attach the new battery unit 42 to the battery support portion 43, the position of the new battery unit 42 placed on the battery platform 25 needs to be adjusted. Thus, the position of the battery platform 25 is adjusted by referring to the data of the spent battery unit 42, which was stored in the memory when the spent battery unit 42 was removed. As a result, the new battery unit 42 is rotated from the reference position in the horizontal plane, as indicated by a solid line in FIG. 5B. If the battery mount portion 13 is lifted after the rotation of the battery unit 42, the battery support portion 43 can support the battery unit 42.

Figure 6B:
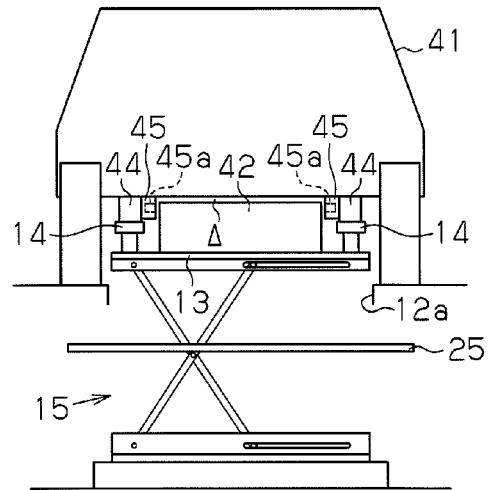
FIG. 6B is a schematic front view showing a state in which the battery mount portion has been moved to the highest position.

After the position of the new battery unit 42 is adjusted, the lifting-lowering means 15 is lifted, so that the battery mount portion 13 is lifted together with the vehicle hoist members 14. In the middle of ascending movement of the lifting-lowering means 15, the battery mount portion 13 receives a battery unit 42 from the battery platform 25. The battery unit 42 is raised further while being on the battery mount portion 13. Then, as described above, the vehicle hoist members 14 contact a part of the lower surface of the under floor reinforcements 44 of the electric vehicle 41. Thereafter, as the battery mount portion 13 and the vehicle hoist members 14 are raised, the electric vehicle 41 is raised, and the inclination of the vehicle body is gradually corrected. The operation of the lifting-lowering means 15 is stopped when the vehicle body becomes level. As shown in FIG. 6B, the battery unit 42 is held on the battery mount portion 13 with the clearance Δ between the battery unit 42 and the lower surface of the floor 46.

Figure 6C:
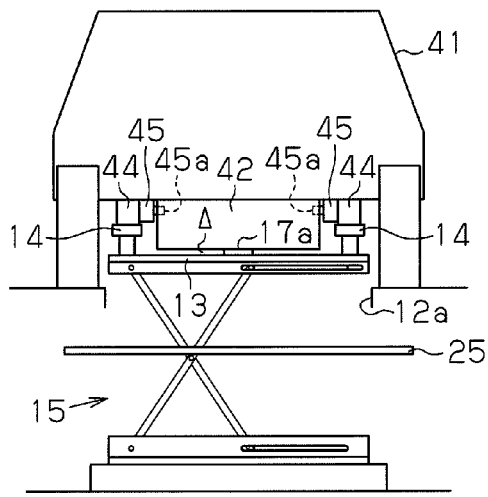
FIG. 6C is a schematic front view showing a state in which the battery lifting-lowering portion has been moved to a lifted position and the battery is locked by the locking devices.
Figure 6D:
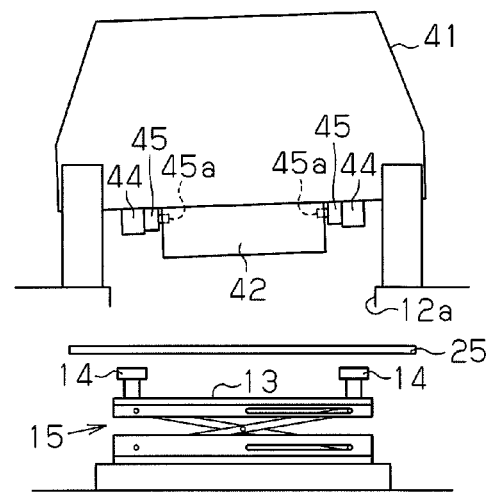
FIG. 6D is a schematic front view showing a state in which the battery mount portion has been moved to the standby position.

Then, the cylinder 17 is activated to raise the battery lifting-lowering portion 17a. Then, as shown in FIG. 6C, the locking devices 45 are activated with the upper surface of the battery unit 42 held in contact with the lower surface of the floor 46. Next, the lifting-lowering means 15 is lowered as shown in FIG. 6D. In this state, the new battery unit 42 is supported by the battery support portion 43 while being locked by the piston rods 45a. When the battery mount portion 13 is at the lowered position, the battery replacement is completed, and the battery platform 25 is returned to the original position.

In rare cases, the electric vehicle 41 is stopped at the battery replacement position with the battery support portion 43 being horizontal. In such a case also, in order to replace the battery unit 42, the lifting-lowering means 15, the cylinder 17, the locking devices 45, and the transporting means 16 are operated in the same manner as in the case in which the battery support portion 43 is not level.

The present embodiment has the following advantages.

(1) The battery replacing apparatus 11 includes a battery mount portion 13, vehicle hoist members 14, and a lifting-lowering means 15. When attaching a battery unit 42 to or detaching a battery unit 42 from the battery support portion 43 of the electric vehicle 41, the vehicle hoist members 14 are moved together with the battery mount portion 13 to be brought into contact with the vehicle body. The battery unit 42 is attached to or detached from the battery support portion 43 from below the vehicle. According to this configuration, even if the battery support portion 43 is inclined in a state in which the vehicle is at the battery replacement position, the vehicle is lifted after being made level by the vehicle hoist members 14 with the battery mount portion 13 lifted to the battery detaching-attaching position. Therefore, batteries can be easily replaced even if the vehicle is inclined at the battery replacement position, without increasing the size of the apparatus.

(2) In an electric vehicle in which a battery unit 42 is located on the lower surface of the floor panel of the vehicle body, the positions of the sides of the battery are often set to be inside of the sides of the vehicle so that the battery is prevented from being damaged when load is applied to the vehicle body from the side. Therefore, the lower surface of the vehicle floor panel needs to have gap areas, in which the battery unit 42 cannot be located, outside the sides of the battery unit 42. In this respect, the vehicle hoist members 14 according to the present embodiment extend like rails on the left and right sides of the battery unit 42 placed on the battery mount portion 13. This configuration allows the vehicle hoist members 14 to support the vehicle using the gap areas. Therefore, compared to a case in which the vehicle hoist members 14 extend along the front and rear ends of the battery unit 42, the size of the areas of the battery unit 42 supported by the battery support portion 43 is large. Also, the vehicle hoist members 14 can stably support the vehicle.

(3) The vehicle hoist members 14 support the vehicle by contacting the under floor reinforcements 44 arranged on the left and right sides of the battery support portion 43. Therefore, unlike a case in which the vehicle hoist members 14 support the rocker panels of the vehicle, the vehicle can be supported without scratching the ornamental surfaces.

(4) The vehicle hoist members 14 are fixed to the battery mount portion 13. This allows the vehicle hoist members 14 to be moved together with the battery mount portion 13. This structure simplifies the structure of the battery replacing apparatus 11 compared to a structure in which the vehicle hoist members 14 are movable relative to the battery mount portion 13 and moved together with the battery mount portion 13 when detaching or attaching the battery unit 42.

(5) The height of the upper surfaces of the vehicle hoist members 14 from the upper surface of the battery mount portion 13 is set such that, the clearance Δ exists between the battery unit 42 on the battery mount portion 13 and the floor 46 of the electric vehicle 41 when the vehicle hoist members 14 lift the electric vehicle 41 so that the vehicle 41 is level. Therefore, when the battery mount portion 13 is raised, with a battery unit 42 placed thereon, to a position that corresponds to the battery support portion 43, the inclined vehicle body and the battery unit 42 are prevented from contacting each other. Thus, no great force is applied to the lower surface of the floor 46 or a part of the battery unit 42.

(6) The battery mount portion 13 has the battery lifting-lowering portion 17a, which is capable of lifting and lowering a battery unit 42 by the distance corresponding to the clearance Δ. According to this configuration, with the battery mount portion 13 at the highest position, the battery unit 42 can be raised by the battery lifting-lowering portion 17a so that the upper surface of the battery unit 42 contacts the lower surface of the floor 46. This allows the battery unit 42 to be locked by the locking devices 45 without creating the clearance Δ between the lower surface of the floor 46 and the upper surface of the battery unit 42. Therefore, during traveling of the vehicle, the battery unit 42 is prevented from chattering.

(7) The battery platform 25 receives, from the battery mount portion 13, a battery unit 42 that has been removed from the battery support portion 43, and transports a new charged battery unit 42 to the battery mount portion 13. The battery platform 25 is configured to be rotational in a horizontal plane. Further, the displacement detecting means is provided in the vicinity of the battery platform 25. The displacement detecting means detects a displacement of the battery unit 42 that has been detached from the battery support portion 43 and moved onto the battery platform 25, with respect to a reference position of the battery unit 42. According to this configuration, the inclination of the new battery unit 42 on the battery platform 25 relative to the horizontal plane can be adjusted as necessary before the new battery unit 42 is placed on the battery mount portion 13 and raised. Thus, even if the electric vehicle 41 is stopped in an oblique state relative to the predetermined position, the battery support portion 43 is capable of supporting the new battery unit 42.

The above illustrated embodiment may be modified as follows.

Locking devices may be used that have a function for raising the battery unit 42 by a distance corresponding to the clearance Δ between the battery unit 42 on the battery mount portion 13 and the floor 46 of the electric vehicle 41 in a state in which the battery mount portion 13 at the highest position. For example, the battery unit 42 may be raised to a locking position by using locking devices that rotates click-like locking members in vertical planes to move the battery unit 42 between a locking position and an unlocking position.

An elastic member such as a rubber member having a thickness greater than the clearance Δ may be fixed to the lower surface of the floor 46 of the electric vehicle 41. In this case, with the battery mount portion 13 having been moved to the highest position, the elastic member is compressed by an amount that corresponds to the clearance Δ by being held between the upper surface of the battery unit 42 and the lower surface of the floor 46. In this state, the battery unit 42 can be locked by the locking devices 45. The battery unit 42 is supported by the battery support portion 43 while receiving the compression reaction force of the elastic member. Therefore, during traveling of the vehicle, the battery unit 42 is prevented from chattering.

The vehicle hoist members 14 does not need to be fixed to the battery mount portion 13 to be moved together with the battery mount portion 13. For example, in the middle of ascending movement of the battery mount portion 13, the vehicle hoist members 14 may start being raised together with the battery mount portion 13 to the highest position. Also, in the middle of the descending movement of the battery mount portion 13, the vehicle hoist members 14 may separate from the battery mount portion 13 to be held at a position higher than the standby position.

The battery mount portion 13 does not need to be fixed to the lifting-lowering means 15. For example, the battery mount portion 13 may include a portion fixed to the lifting-lowering means 15 and a pallet that is separable from the fixed portion. The pallet has vehicle hoist members 14 and is configured to mount a battery unit 42 on it. In this case, the battery unit 42 is mounted on the battery platform 25 together with the pallet. The battery unit 42, together with the pallet, is transferred between the battery platform 25 and the transporting means 16, and transported.

In the illustrated embodiment, the vehicle hoist members 14 lift a vehicle with rod-like members linearly contacting the vehicle. The present invention is not limited to this configuration. For example, vehicle hoist members 14 may be formed as contacting portions at both ends of each rod-like member, and a vehicle may be lifted at the points of the contacting points.

A detecting means for detecting an inclination of a vehicle relative to a horizontal direction may be provided. In this case, the amount of lifting of the battery mount portion 13 and the vehicle hoist members 14 by the lifting-lowering means 15 may be adjusted based on the detection information of the inclination detecting means. If the detection information of the inclination detecting means is not used, the amount of lifting of the vehicle hoist members 14 is set in advance to a value determined according to the height of the battery support portion 43 and the size of the wheels. Therefore, there is no problem as long as battery replacement is performed for the same vehicle. However, when battery replacement is performed for different vehicles, the height of the battery support portion 43 and the size of the wheels need to be obtained prior to the battery replacement, and the amount of lifting of the vehicle hoist members 14 needs to be renewed. In this regard, if the detection information of the inclination detecting means is used, the vehicle hoist members 14 only need to be lifted to a position where the vehicle is level regardless of the model of the vehicle.

When lifting a vehicle by the vehicle hoist members 14 such that the vehicle becomes level, the vehicle may be lifted to a height at which all the wheels are separated from the support plate 12. In this case, the amount of lifting of the vehicle hoist members 14 can be set to the same value of different models of vehicles that have different heights to the battery support portion 43.

In the above described configuration, in which the vehicle body is lifted with the vehicle hoist members 14 contacting the under floor reinforcements 44, an auxiliary member may be attached to each under floor reinforcement 44 in order to increase the area by which the vehicle hoist member 14 contacts the corresponding under floor reinforcement 44.

When lifting a vehicle body by the vehicle hoist members 14 and adjusting the attitude of the vehicle, the vehicle hoist members 14 do not need to contact the under floor reinforcements 44 on the left and right sides of the battery support portion 43, but may contact rocker panels. Also, a vehicle does not need to be supported on the left and right sides of the battery support portion 43, but may be supported on the front and rear sides of the battery support portion 43.

The following configuration may be employed as a configuration for attaching a new battery unit 42 to the battery support portion 43 when the front-rear direction of the electric vehicle 41 and the transporting direction of the transporting means 16 do not satisfy the predetermined positional relationship. Specifically, the transporting means 16 is formed by a left-side conveyor belt and a right-side conveyor belt, which can be driven independently from each other. The battery mount portion 13 is moved between a standby position and the highest position while being passed between the conveyor belts. A spent battery unit 42 detached from the battery support portion 43 is transferred to the transporting means 16 to be placed on both conveyor belts. The laser range finders 37a, 37b detect the state of the battery unit 42, which has been transported from the battery support portion 43 to the conveyor belts. The detection data is stored in the memory of the controller 38. In accordance with the state when the spent battery unit 42 was transported from the battery support portion 43 to the transporting means 16, the controller 38 adjusts the inclination of a new battery unit 42 relative to the reference position. Specifically, the amounts of operation of the left-side conveyor belt and the right-side conveyor belt are changed such that the battery unit 42, which is mounted on the conveyor belts, is rotated in the horizontal plane. This configuration simplifies the structure of the apparatus.

The following configuration may be employed such that, when the electric vehicle 41 is stopped at the battery replacement position, the front-rear direction of the electric vehicle 41 and the transporting direction of the transporting means 16 satisfy the predetermined positional relationship. For example, a guide portion may be used for stopping the electric vehicle 41 at a predetermined position. Alternatively, when the electric vehicle 41 is stopped at a position displaced from the predetermined position, an instruction for redoing the stopping operation may be issued. This eliminates the necessity for the configuration for rotating the battery platform 25 and the configuration for independently driving the left-side conveyor belt and the right-side conveyor belt of the transporting means 16 to rotate the battery unit 42 on the conveyor belts in the horizontal plane.

For example, the battery unit 42 may have pins, and a vehicle may have pin holding devices serving as the locking devices 45.

For example, the lifting-lowering means 15 may be formed by a structure that uses hydraulic cylinders or electric cylinders for lifting and lowering the battery mount portion 13.

The transporting direction of the transporting means 16 may be the same as the front-rear direction of the vehicle stopped at the battery replacement position.

Instead of advancing to the battery replacement position, the vehicle may be backed to the battery replacement position. In this case, chocks contact the rear wheels of the vehicle to stop the vehicle at the battery replacement position.

The transporting means 16 is not limited to a chain conveyor, but may be a belt conveyor or a roller conveyor. In the case of a roller conveyor, the push plate 35 of the transfer device 33 is movable on the roller conveyor between a position where the push plate 35 pushes the battery unit 42 and a position where the push plate 35 does not interfere with the battery unit 42.

The battery replacing apparatus 11 may be provided in a pit formed in the ground. In this case, a vehicle can be stopped on a plate covering the pit or over the pit.

The present invention is not limited to the electric vehicle 41, the drive source of which is only a battery, but may be applied to a hybrid vehicle, which includes both of a motor and an engine.

When the vehicle hoist members 14 lift the vehicle body to the height at which all wheels float in the air so as to adjust the posture of the vehicle body, it is unnecessary to set up the vehicle body to be level at the state in which the elevation of the vehicle body has stopped. That is, in this state, the vehicle body may be inclined to the extent that it does not cause an obstacle for supporting the vehicle body.

In this case, it is necessary only to set up the vehicle body in such a manner that the bottom surface of the battery unit 42 and the battery mount portion 43 are arranged parallel to each other and have the clearance Δ therebetween before locking of the battery unit 42 to the battery support portion 43 is canceled.

The invention claimed is:
1. A vehicle battery replacing apparatus for detaching a battery from or attaching a battery to a battery support portion provided in a vehicle from below, the apparatus comprising:
   a battery mount portion having a hole, the battery mount portion configured to support the battery upon detachment of the battery from or attachment of the battery to the battery support portion, the battery mount portion opposing the battery support portion;
   vehicle hoist members arranged at opposite sides of the hole, which move together with the battery mount portion to contact the vehicle body at least when the battery is detached from or attached to the battery support portion, so that upper surfaces of the vehicle hoist members are higher than an upper surface of the battery mount portion; and
   a lifting-lowering mechanism for lifting and lowering the battery mount portion having the vehicle hoist members, and a battery lifting-lowering portion configured to move through the hole in the battery mount portion, between a position below the upper surface of the battery mount portion and a position above the hole in the upper surface of the battery mount portion to lift and lower the battery when the vehicle is in a lift position by the vehicle hoist members.

2. The vehicle battery replacing apparatus according to claim 1, wherein the vehicle hoist members are rod-like and configured to extend in the front-rear direction of the vehicle body, and on the left and right side of the battery.

3. The vehicle battery replacing apparatus according to claim 1, wherein the height of each of the vehicle hoist members from the upper surface of the battery mount portion is set such that, when the vehicle hoist members lift the vehicle so that the vehicle is level, when the battery is to be lifted toward the vehicle, a clearance $\Delta$ exists between the upper surface of the battery on the battery mount portion and the lower surface of the floor of the vehicle, and when the battery is to be lowered, a clearance $\Delta$ exists between the lower surface of the battery and the upper surface of the battery mount portion.

4. The vehicle battery replacing apparatus according to claim 3, wherein the battery lifting-lowering portion is configured to lift and lower the battery by a distance corresponding to the clearance $\Delta$.

* * * * *